(12) United States Patent
Bond et al.

(10) Patent No.: US 7,251,254 B2
(45) Date of Patent: Jul. 31, 2007

(54) TELECOMMUNICATION NETWORK SYSTEM AND METHOD IN COMMUNICATION SERVICES USING SESSION INITIATION PROTOCOL

(75) Inventors: Gregory W. Bond, Hoboken, NJ (US); Eric Cheung, New York, NY (US); Kermit Hal Purdy, Bernardsville, NJ (US); Xiaotao Wu, New York, NY (US); Pamela Zave, Chatham, NJ (US)

(73) Assignee: AT&T Corp., New York, NY (US)

( * ) Notice: Subject to any disclaimer, the term of this patent is extended or adjusted under 35 U.S.C. 154(b) by 880 days.

(21) Appl. No.: 10/653,772

(22) Filed: Sep. 3, 2003

(65) Prior Publication Data

US 2005/0047389 A1    Mar. 3, 2005

(51) Int. Cl.
*H04J 3/16*  (2006.01)
(52) U.S. Cl. ........................................ 370/467; 370/466

(58) Field of Classification Search ................ 370/466, 370/467, 400, 401
See application file for complete search history.

(56) References Cited

U.S. PATENT DOCUMENTS

| 5,737,403 | A | 4/1998 | Zave |
| 6,160,883 | A | 12/2000 | Jackson et al. |
| 6,404,878 | B1 | 6/2002 | Jackson et al. |
| 2003/0055981 | A1 | 3/2003 | Hakkarainen et al. |
| 2003/0115332 | A1 | 6/2003 | Honeisen |
| 2003/0145054 | A1 | 7/2003 | Van Dyke |

*Primary Examiner*—Creighton Smith

(57) ABSTRACT

An implementation of a voice-over-Internet protocol (VoIP) system for accomplishing two-way, three-way and conference calling between two or more parties is disclosed, in which new call features are readily adapted. The VoIP system is implemented in a Session Initiation Protocol (SIP) framework in which aspects of Distributed Feature Composition (DFC) architecture are modified and applied to overcome known limitations in the adaptability of existing VoIP frameworks.

36 Claims, 6 Drawing Sheets

TELECOMMUNICATION NETWORK SYSTEM AND METHOD IN COMMUNICATION SERVICES USING SESSION INITIATION PROTOCOL

FIELD OF THE INVENTION

The present disclosure relates generally to telephonic communications, and relates more particularly to Internet-based telecommunications multimedia communications.

BACKGROUND OF THE INVENTION

The Voice over Internet Protocol (VoIP) community has been developing and improving voice communications systems and applications implemented over the Internet, with the goal of providing, improving upon and expanding call services that are commonly available over public switched telephone networks (PSTNs) alone. Session Initiation Protocol (SIP) is one existing application-layer VoIP for creating, modifying, and terminating call sessions involving one or more users. Such sessions may include Internet telephone dialogs and sessions, multimedia distribution, multimedia conferences, and the like. In existing SIP domains, distributed proxy servers route requests to a user's current location, authenticate and authorize users for various services, implement provider call-routing policies, and provide various call features to users. Call invitation requests are used to create sessions, and carry session descriptions that allow callers and callees to agree on a set of compatible media types for accomplishing multi-party communications. SIP also provides a registration function for a user to subscribe to various call features, such as three-way calling. SIP registration functions also allow users to upload their current locations for use by proxy servers that receive such call requests for a user.

Similar to what has been encountered during the evolution of PSTNs, as new options are added to the suite of available call features in SIP, it becomes increasingly difficult to manage the behavioral complexity of new call features and their resulting interactions with existing call features.

Distributed feature composition (DFC) has been previously developed by certain of the inventors of the present application to contain this feature-interaction problem in PSTN environments. A description of DFC may be found in U.S. Pat. Nos. 6,404,878 and 6,160,883, both of which are assigned to the assignee of the present invention and incorporated herein by reference. DFC allows for the modification and addition of call features while minimizing unexpected call feature interference and system malfunctions. It is a virtual architecture within which a call feature is implemented by a small number of physical components, collectively called a feature box, that are added to a call route by featureless internal calls through the communications network and are connected by known PSTN network mechanisms. A customer call is handled by building a configuration of feature boxes that are dedicated to the appropriate call features assigned to the call in a predetermined order of priority.

Any new desired features are implemented in DFC by as small a number of new components as possible, preferably just one, along with predetermined rules for joining the new components. The architectural style of DFC is similar to dynamic pipe-and-filter technologies, where the feature boxes are like filters, and the internal featureless call connections between feature boxes are like pipes. DFC feature boxes are physically independent entities, each with its own state, sharing no state with other feature boxes and independent of the identities of its neighboring components. DFC feature boxes are also completely dedicated to an assigned call, and only become available to other calls when the assigned call is terminated or cancelled. This independence contributes significantly to the ability of DFC to manage feature interactions, however, requires a large number of physical components to accommodate a large network of users.

DFC architecture may not simply be incorporated into SIP frameworks. First, the systems are implemented in different domain environments having different component types and signaling protocols. The requirements for certain DFC and SIP hardware also conflict in certain areas of implementation. However, it would be beneficial if SIP could be improved to allow for the ready accommodation of new call features therein.

Third party service developments, such as Call Processing Language and SIP Common Gateway Interface, as well as a variety of distributed component architectures and feature interaction protocols, such as Software Engineering Research Library (SERL), Third Party Call Control (3PCC) and Application Server Component (ASC), have been proposed to improve VoIP performance. However, none has definitively addressed the feature interaction problem in SIP.

SUMMARY OF THE INVENTION

It is an object of the present disclosure, therefore, to have a system directed to particular components of an improved VoIP communications protocol that is readily adaptable to new call features. In particular, one aspect of the invention includes a method and apparatus for establishing one or more call features within a VoIP domain for handling a network telecommunications call. The domain has a predetermined protocol for handling call invite and other call requests. In certain embodiments, an incoming SIP request is translated to an internal DFC signaling message that includes an identification of a signaling path and a media path for the call request. The internal routing of the call to appropriate feature boxes may be accomplished using such DFC signaling messages. Existing SIP parameters in the call request may remain unchanged in the translation. Feature boxes are assigned to the call request based on its assigned call features and the predetermined priority of call features.

In various embodiments, a feature box is not a physically separate physical component, but may be implemented as dedicated logical unit of a telecommunications server or the like. Individual feature boxes are dedicated to a call request until a call is terminated. A follow-me call feature, in which a new address for a call request to a user is established in accordance with user customizable preferences, may be implemented by one or more separate follow-me feature boxes.

In still further embodiments, the media flow corresponding to the call request may be routed directly between two endpoints of the call, and the route may be exclusive of any feature box for a featureless call.

BRIEF DESCRIPTION OF THE DRAWINGS

Further aspects of the present disclosure will be more readily appreciated upon review of the following detailed description of its various embodiments when taken in conjunction with the accompanying drawings, of which.

DETAILED DESCRIPTION OF THE SPECIFIC EMBODIMENTS

Figure 1:
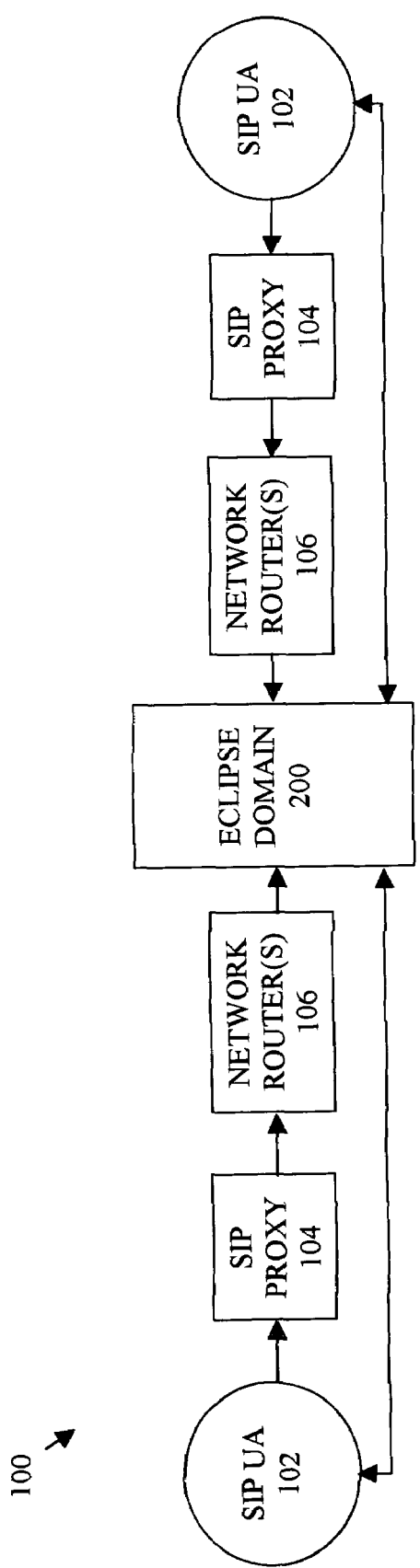
FIG. 1 is a schematic diagram of an exemplary SIP network environment for the deployment of feature boxes.

Referring now to FIGS. 1-6, wherein similar components of the present disclosure are referenced in like manner, various embodiments of a telecommunication network system and method in communication services using Session Initiation Protocol are disclosed. The existing structure for SIP and DFC systems will now be described in greater detail to illustrate the distinctions between prior schema and those of the present disclosure, as well as prior elements that may be used to enable certain functions described herein.

Previous implementations of SIP are structured as a layered protocol in which a set of generally independent processing stages are coupled together. This description of protocol behavior as layers is done for purposes of illustration only. It is not meant in any way to dictate a necessary feature for implementation. Each layer is compliant to a set of predetermined rules defined by that layer. Not every physical component specified by the SIP protocol utilizes every layer. Furthermore, the elements specified by SIP are logical elements, not physical ones, although a physical realization could be accomplished with physically distinct logical hardware elements and on a transaction-by-transaction basis. The existing SIP environment will be briefly described with respect to the types of hardware employed and the format for communications among these components. A complete description of SIP can be found at IETF.ORG.

A first program layer of SIP is its syntax and encoding layer. Encoding is specified using an augmented Backus-Naur Form (BNF) grammar having a standard message structure.

A second layer is the transport layer that defines how clients and servers send or receive requests and responses over the network. All SIP elements contain the transport layer.

A third layer is the transaction layer. A transaction is a call request sent by a client to a server, along with all responses to that request sent from the server transaction back to the client, using the transport layer. The transaction layer encompasses client transactions and server transactions, each of which are performed by an SIP component, such as a finite state machine (FSM) that is dedicated to process a particular request. The transaction layer handles application-layer retransmissions, matching of responses to requests, and application-layer timeouts. Any task that a user agent (UA) accomplishes, as described further below, may take place using a series of client and server transactions. In SIP, UAs contain a transaction layer, as do SIP stateful proxies. Stateless proxies, however, do not contain a transaction layer.

A fourth layer is the transaction user (TU) layer. Each of the SIP entities, except the stateless proxy, is designated as a TU. When a client TU wishes to send a call request, it creates a client transaction instance and passes the request with the destination IP address, port, and transport.

A TU that creates a client transaction may also cancel it. When a client cancels a transaction, it requests that the server stop further processing, revert to the state that existed before the transaction was initiated, and generate a specific error response to that transaction. This is done with a CANCEL request, which constitutes its own transaction.

SIP components, including UA clients and servers, stateless and stateful proxies and registrars, contain a core that distinguishes them from each other. Cores, except for the stateless proxy, act as TUs within the environment and employ the TU layer. While the behavior of UA client and server cores depends on the particular circumstances of a transaction, there are some common rules applicable to both. For a UAC, these rules govern the construction of a call request, and for a UA server generally, they govern the processing of call requests and generating responses thereto.

Registration of users plays an important role in SIP applications. A dedicated UA server, referred to as an SIP registrar, is thus designated to handle REGISTER requests.

In order to avoid malicious floods of unauthenticated requests, known as denial-of-service attacks, a stateless UA is used to handle unauthenticated requests for which a challenge response is to be issued. The stateless UA replies to requests normally, but discards any state that would ordinarily be retained by a UA server after a response has been sent. If a stateless UA server receives a retransmission of a request, it regenerates the response and resends it, just as if it were replying to the first instance of the request. Stateless UA servers do not use a transaction layer. Instead, they receive requests directly from the transport layer and send responses directly to the transport layer.

A back-to-back user agent (B2BUA) is a logical entity that receives a call request and processes it as a UA server. In order to determine how the request should be answered, it also acts as a UA client and generates requests. Unlike a proxy server, it maintains dialog state and must participate in all requests sent on the dialogs it has established.

The most important method in SIP is the INVITE method, which is used to establish a session or dialog between users. A dialog is a peer-to-peer SIP relationship between two user agents that persists for some time. The dialog facilitates sequencing of messages and proper routing of requests between user agents. A session is a collection of participants, and the streams of media flow there-between. A session may include one or more SIP dialogs.

A status-code is a 3-digit integer that is generated in SIP to indicate the outcome of an attempt to respond to a call request. The 3-digit system has similarities to that used in a hyper-text transfer protocol (HTTP) environment. The first digit of the status-code is assigned to a particular class of response. The last two digits have only a sequential role in identifying individual responses of a particular class. Any response with a status-code between 100 and 199 is referred to as a "1xx response", any response with a status code between 200 and 299 as a "2xx response", and so on. SIP allows six values for the first digit, with classes assigned to each of digits 1-6 as follows:

1xx: Provisional responses indicating that a request was received, and that a UA is continuing to process the request.

2xx: Success response classes in which the call request was successfully received, understood, and accepted.

3xx: Redirection responses indicating that further action needs to be taken in order to complete the call request.

4xx: Client Error responses in which the request contains bad syntax or cannot be fulfilled by a UA.

5xx: Server Error responses in which the UA fails to fulfill an apparently valid request.

6xx: Global Failure responses in which the request cannot be fulfilled at any server.

A reason-phrase is intended to give a short textual description of the status-code to a human operator or user. Each status-code also dictates an appropriate action to take in response to the received code (which is a default action unless otherwise indicated). It should be readily apparent that no SIP component is required to examine or display any reason-phrase. The following chart of specific wording for the reason-phrase may be altered or omitted in various embodiments:

| STATUS-CODE | REASON-PHRASE | ACTION |
| --- | --- | --- |
| 100 | TRYING | stops retransmission of INVITE |
| 180 | RINGING | multiple status messages sent upstream |
| 183 | SESSION PROGRESS | header fields, or message body may be used to convey more details about the call progress. |
| 200 | OK | |
| 3xx | WARNING CODE | |
| 400 | BAD REQUEST | |
| 401 | UNAUTHORIZED | |
| 402 | PAYMENT REQUIRED | |
| 403 | FORBIDDEN | |
| 404 | NOT FOUND | send unknown status message followed by teardown |
| 405 | METHOD NOT ALLOWED | |
| 406 | NOT ACCEPTABLE | |
| 407 | PROXY AUTHENTICATION REQUIRED | |
| 408 | REQUEST TIMEOUT | |
| 409 | CONFLICT | |
| 410 | GONE | |
| 413 | REQUEST ENTITY TOO LARGE | |
| 414 | REQUEST-URI TOO LONG | |
| 415 | UNSUPPORTED MEDIA TYPE | |
| 420 | BAD EXTENSION | |
| 480 | TEMPROARILY UNAVAILABLE | |
| 481 | CALL LEG/TRANSACTION DOES NOT EXIST | |
| 482 | LOOP DETECTED | |
| 483 | TOO MANY HOPS | |
| 484 | ADDRESS INCOMPLETE | |
| 485 | AMBIGUOUS | |
| 486 | BUSY HERE | |
| 487 | REQUEST TERMINATED | |
| 488 | NOT ACCEPTABLE HERE | |
| 500 | SERVER INTERNAL ERROR | |
| 501 | NOT IMPLEMENTED | |
| 502 | BAD GATEWAY | |
| 503 | SERVICE UNAVAILABLE | |
| 504 | SERVER TIME-OUT | |
| 505 | VERSION NOT SUPPORTED | |
| 513 | MESSAGE TOO LARGE | |
| 600 | BUSY EVERYWHERE | |
| 603 | DECLINE | sends reject message on all channels followed by teardown |
| 604 | DOES NOT EXIST ANYWHERE | send unknown status message followed by teardown |
| 606 | NOT ACCEPTABLE | |

SIP header fields are similar to HTTP header fields in both syntax and semantics. In particular, SIP header fields follow the definitions of syntax for the message header and the rules for extending header fields over multiple lines. Header fields which are needed for proxy processing, such as via, route, record-route, proxy-require, max-forwards, and proxy-authorization, are placed at the top of an SIP request to facilitate rapid parsing.

The details of a session or dialog, such as the type of media, codec, or sampling rate, are not described using SIP. Rather, the body of a SIP message contains a description of the session that is generally encoded in some other protocol format, such as Session Description Protocol (SDP) and included in an SIP message.

Existing implementations of DFC are meant for deployment primarily over PSTNs and VoIP domains. The routing of calls between feature boxes and/or other DFC components is the responsibility of a router. A user's request for service typically causes the caller's trunk interface (TI) box to send a setup message to a DFC router. A setup message is a request to create an internal call. The router routes the call to a feature box, which receives it and then completes the protocol to set up the internal call by connecting the interface box and the feature box. Typically a feature box that receives an incoming internal call places a corresponding outgoing internal call. The outgoing call is placed using the setup message received as part of the incoming call, and is considered a continuation of the incoming call. This creates a chain of feature boxes and internal calls, which extends through all the applicable feature boxes to a TI box of a final target address for the call.

A chain of feature boxes assembled in this way contains feature boxes in three zones. First there is a source zone (Z1), consisting of feature boxes subscribed to by the source address of the chain and applicable to any call in which that subscribing address is the source address. Second there is a network zone (Z2), consisting of feature boxes whose presence is required by the network. Third is a target zone (Z3), consisting of feature boxes subscribed to by the target address of the chain and applicable to any call in which that subscribing address is the target address. In each zone, the order of feature boxes is determined by a fixed precedence order.

Before routing to the first feature box in a zone, a DFC router constructs a routing list of feature box types for the zone, and inserts it into the setup message. When a router routes a setup message to a feature box, it removes the type of that feature box from the head of the routing list. The list is copied by the feature box into the setup message of the continuation call, so that the router routes the continuation call to the type of feature box that is now the head of the list. When the routing list is exhausted, the zone is complete. In this way a chain of feature boxes with all of the prescribed box types, in the prescribed order, is assembled.

The implementations of DFC described in various relevant portions of co-pending U.S. Pat. Nos. 6,404,878 and 6,160,883 are hereby incorporated by reference. As is described in more detail therein, new call features may be freely added to or modified within a DFC environment, and feature specification data (including zone assignment and priority) for new call features may be readily integrated.

Turning now to FIG. 1, there is depicted an Extended Communications Layered on Internet Protocol Synthesis Environment (ECLIPSE) domain 200 for providing distributed, modularized and compositional communication services in an IP network 100, which may be any type of communication and/or computer network including physical and/or wireless transmission media, and hardware that includes microprocessors and memory for storing processing instructions to execute the functions described herein.

The ECLIPSE domain 200 within IP network 100 allows for rapid deployment and integration of call features, third party services, user customization and communication across multiple domains and nodes in an SIP environment. The management of feature interaction among multiple ECLIPSE domains 200 can be accomplished with standard networking topologies.

The ECLIPSE domain 200 offers finite state machine (FSM) abstraction and a domain-specific language for call feature specification and development. The ECLIPSE domain 200 may be operable with a number of third party communication protocols, such as H.323 and the AMERICA ONLINE TOC protocol. The ECLIPSE domain 200 may further provide an interface to media resources for accomplishing media processing functions, a flexible provisioning system and an HTTP interface for administrative and user self-provisioning functions, fault management, and database support. ECLIPSE operates with a media abstraction communications layer for allowing distributed media control by feature boxes. Each of these functionalities will be described in more detail commencing with FIG. 2 below.

The ECLIPSE domain 200 may communicate with a plurality of SIP UAs 102, 103 directly and via a plurality of SIP proxy servers 104 and network routers 106. Although a limited number of components of IP network 100 are shown in FIG. 1, it should be readily appreciated that any number of such components may be included. In addition, any component of IP network 100 may communicate directly with any other component or via a variety of available intermediary components as is well known in the art. The ECLIPSE domain 200 may handle a large number of simultaneous and sequential call requests, on the scale of a national or global network of users, and must be able to differentiate call requests based on message header information. In addition, it should be recognized that, although SIP UAs 102, 103 are shown as call endpoints in FIG. 1. Additional client TIs may also be included as endpoints of a call over the IP network 100.

The ECLIPSE domain 200 operates with a message structure similar to SIP in which a plurality of headers and fields are used to convey relevant communications information. The ECLIPSE domain 200 should recognize all standard SIP headers, such as via, record-route and route, for purposes of routing a call request.

The ECLIPSE domain 200 performs the general functions of a stateful SIP proxy server in many regards. Like a standard featureless SIP proxy server, the ECLIPSE domain 200 should preserve the values of all SIP header information received within a DFC signaling message. Feature boxes within the ECLIPSE domain 200, more particularly described below with respect to FIG. 2, may be assigned to handle any feature related information.

Previously in SIP, an SIP proxy server would generally never route the media flow of a call through it. This is because for featureless calls, it is more efficient to have the media flow go directly between two call endpoints, such as caller and callee TIs or SIP UAs 102, 103. In a featureless call in the present disclosure, when a new call feature is invoked that later requires control of the media flow, the ECLIPSE domain 200 may attain control of the media flow using RE-INVITE requests, described later below.

In both prior SIP domains and the present disclosure, domain endpoints perform identical functions and generate like responses regarding the media flow. However, in a call with assigned call features, the ECLIPSE domain 200 may need to control the media flow related to such features and so will direct the media flow to be routed through it.

Similar to previously described SIP UAs that receive media flow for a call, the ECLIPSE domain 200 is also able to initiate and terminate a call. For example, the ECLIPSE domain 200 can setup a conference and send INVITE requests to multiple parties to join the conference. Thus, the ECLIPSE domain 200 incorporates certain functionality of existing SIP UAs.

Figure 2:
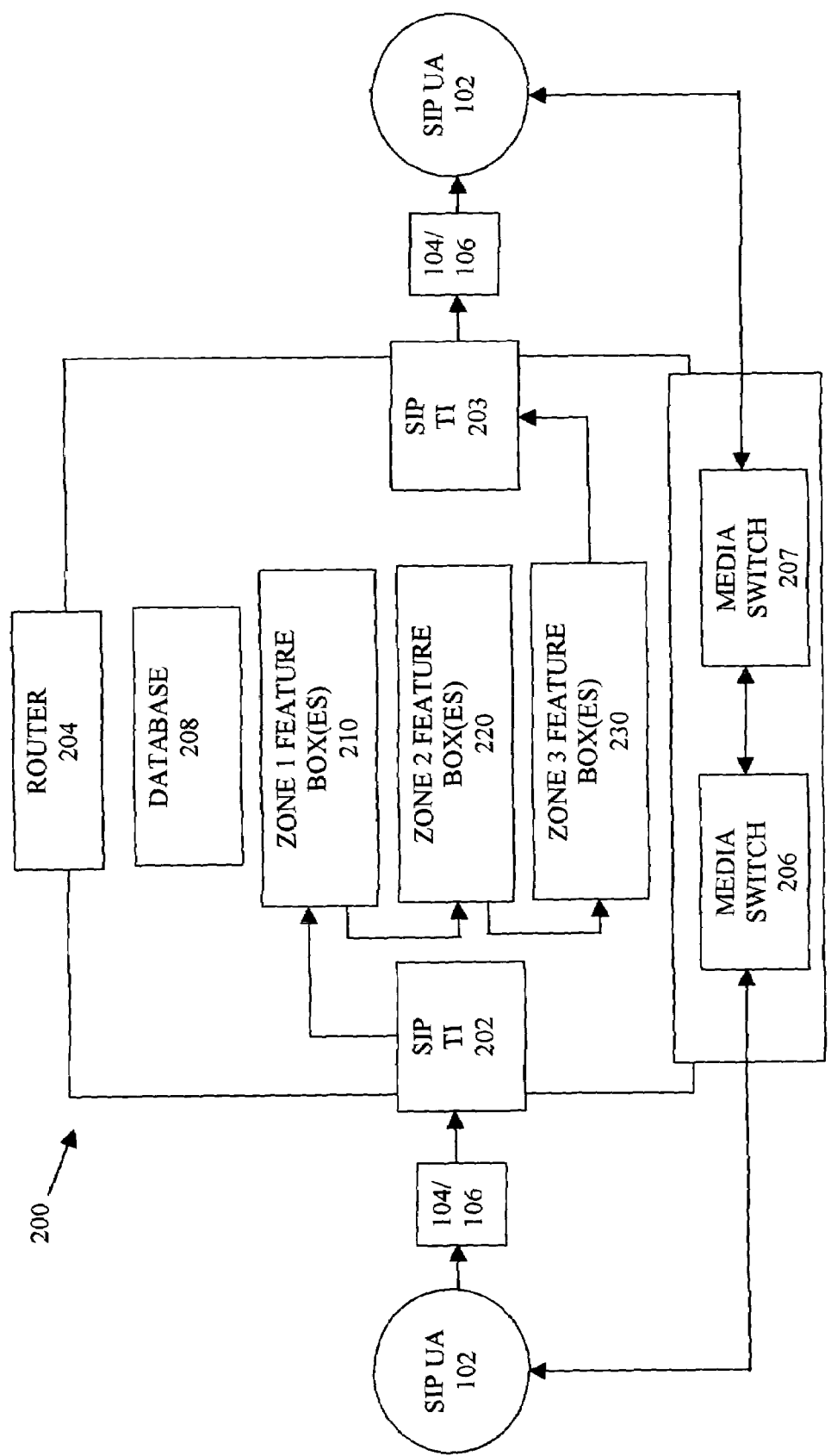
FIG. 2 is a schematic diagram of an exemplary domain within the SIP network environment of FIG. 1.

Turning now to FIG. 2, various components of the ECLIPSE domain 200 will be described with respect to particular embodiments, which should not be viewed as the only configuration in which to implement the present invention. In certain embodiments, the ECLIPSE domain 200 includes a plurality of SIP TIs 202 and 203, one or more routers 204, a database 208 and a plurality of feature boxes 210, 220 and 230, that may be prioritized first by zone (Z1, Z2 then Z3) and having a predetermined priority within their respective zones that allow for feature interaction without interference. Feature boxes 210-230 may be embodied in separate physical components or may be logical components within a single network telecommunications server. The feature boxes 210-230 are each assigned to a call handled by ECLIPSE domain 200 and provide the call features required for the call by caller and callee users.

Calls between feature boxes 210-230 and the SIP TIs 202, 203 are featureless calls. A variety of feature boxes may be provided within the system to accommodate a vast number of call features. Furthermore, a feature box can influence the routing dynamically to alter the feature boxes assembled into the configuration for a session. For example, if a feature box in a target zone continues a call but changes its target address, the DFC router will stop routing to feature boxes of the previous target address, and begin to route to target-zone feature boxes of the new target address.

In this way new and third-party call features are readily accommodated by providing new feature boxes to the ECLIPSE domain and specifying their place in the precedence order. This allows the new features to be used with existing call features, and no additional effort is required to integrate them. The ability to assemble call features dynamically and integrate them automatically thus differs from existing SIP proxy servers, which have no such capabilities. Feature boxes may be provided to handle registration, authentication, and the handling of particular SIP response codes, and to provide other call features such as the follow-me feature described below with respect to FIG. 3. SIP TI 202 and 203 act as endpoints for the ECLIPSE domain 200 for sending and receiving signaling messages over IP telecommunications network 100. Since line interfaces and trunk interfaces perform similar functions, the SIP TI 202/203 may be composed of any number of SIP TIs and or LIs. SIP TIs 202 and 203 may be logically separated components or may be components of an integrated device. For an ECLIPSE domain 200 with features, SIP TI 202 and 203 may translate incoming SIP requests to DFC signaling messages so that they may be understood by feature boxes 210-230

The original SIP message may be contained as a parameter in the DFC message that the SIP TI 202 issues. An SIP-aware feature box (not shown) may examine the original SIP message and perform SIP specific processing.

Router 204 is provided to route messages based on the source, target and dialed addresses received in the signaling message. Any number of routers 204 may be provided to handle appropriate call volumes. In the cases of featureless calls or the like, media flow may be routed directly between SIP UAs 102 via media switches 206 and 207 that route and forward media flow for a call, generally as Real Time Protocol (RTP) packets.

The database 208 is provided within the ECLIPSE domain 200 to store user information such as provisioned users, call features to be applied to calls to and from users, and a user's preferred priority of addresses to which a call to the user is to be redirected.

The ECLIPSE domain 200 handles all registration requests for provisioning new users, or changing user preferences, thereby functioning in part as existing SIP registrars. In certain embodiments, registration may be handled by SIP TIs 202, 203 or by separate TIs or LIs dedicated to registration requests (not shown).

The ECLIPSE domain 200 should also be able to distinguish third party registrations of users, as is common in telecommunications services, from those performed directly by subscriber-users based on received user information. For example, a registration request in which the FROM header contains a uniform resource identifier (URI) of a third party performing the registration, and in which the TO address is different from the FROM header (in that it contains not the same URI but the URI of the subscriber), will be recognized as a third party registration.

The ECLIPSE domain 200 also incorporates many of the functions of previous SIP B2BUAs, and may be thought of as an inbound and outbound SIP UA concatenated together and communicating with each other and feature boxes 210-230 via DFC routing signals. This enables the ECLIPSE domain 200 to provide flexibility for call features that require media flow control. Establishing B2BUA functions within the ECLIPSE domain 200 also simplifies the complexity of the call endpoints 202, 203 of the ECLIPSE domain 200. For example, in a call involving a mobile device, such as a cellular telephone, one endpoint of the ECLIPSE domain 200 may receive a change in the IP address of the call without notifying the other endpoint.

Treating the ECLIPSE domain as a B2BUA may, in certain embodiments, require the alteration of some SIP message headers when the domain 200 relays a call signal, including headers for feature-related information. For example, the contact header in an incoming invite call request may be changed to the address of the domain 200 when the call request is forwarded. Alternatively, the address may be left unchanged, but instead, host and port designations may be altered.

User registration is accomplished by the ECLIPSE domain 200 as follows. Registration requests are handled by SIP registration feature boxes 210 that are prioritized in the source zone (Z1). A registered user can change his call contact information by sending subsequent REGISTER requests to the ECLIPSE domain 200. The SIP registration feature box stores the received contact information in the database 208 for later use by a follow me feature box in Z3. When a SIP registration request arrives at SIP TI 202 or 203, it will transmit a setup message to the router 204 with the TO header as the source address, and empty target address and dialed string fields, thereby invoking only source zone feature boxes such as the SIP registration feature box. The TO header specified in the setup or user-status message must be a provisioned address.

Another type of call request handled by the ECLIPSE domain 200 is the INVITE request for establishing a call.

| FIELD in ECLIPSE Setup Message | HEADER in SIP INVITE message |
|---|---|
| Source Address | FROM |
| Target address | REQUEST URI |
| Dialed string | TO |

When an INVITE is received by inbound SIP TI 202, it formulates a setup message including the source address of the request, the target address of the request and the dialed string or dialed number for the call. This setup message is then routed to the router to 204 that assigns appropriate feature boxes 210-230 for establishing call features. Any SDP information in the INVITE message will be sent to the media switch after call setup. The call is ultimately routed to outbound SIP TI 203 so that the INVITE request can be routed to the appropriate contact address.

For incoming INVITE requests, all media specified by a caller may be indicated in the content of the message and will be put into the media choice field of the setup message by inbound SIP TI 202. The outgoing INVITE request to an invited party may be handled in two manners. A first option is that the outbound SIP TI 203 can send an INVITE request to the invited party with the media chosen by the caller. The callee may accept none, part, or all of the media choices based on the callee's capabilities. One or more accept or reject messages corresponding to the media choices may be transmitted back to the caller.

The other option is that the outbound SIP TI 203 transmits the INVITE request with no SDP to the callee. Upon receiving a response, it can then send a later avail message or the like with the media choices of the callee. The caller then selects the preferred media that is available and communicates the media choice in the SDP of an acknowledge (ACK) message or the like. This allows the caller to know the callee's capability before making a media choice without having to check the parameters of the contact address registered by the callee.

The ECLIPSE domain 200 may receive RE-INVITE call requests for a number of reasons, and will have a predetermined response based on the reason for the RE-INVITE. For example, where the remote user has changed its IP address (i.e. in a mobile phone system), the ECLIPSE domain 200 will not notify the SIP UA of the other parties to the call. The ECLIPSE domain 200 may be adapted to either notify or not notify invited parties if the codec is changed. The ECLIPSE domain 200 will, however, notify invited parties if media is added or subtracted regarding a call.

A wide variety of call features may be readily added and incorporated in the system disclosed herein. One such call feature is the follow-me call feature in which calls to a callee address may be automatically redirected to one or more addresses in a priority established by a user. The priority and listed addresses may further have specified period of time for which the preference is valid.

Figure 3:
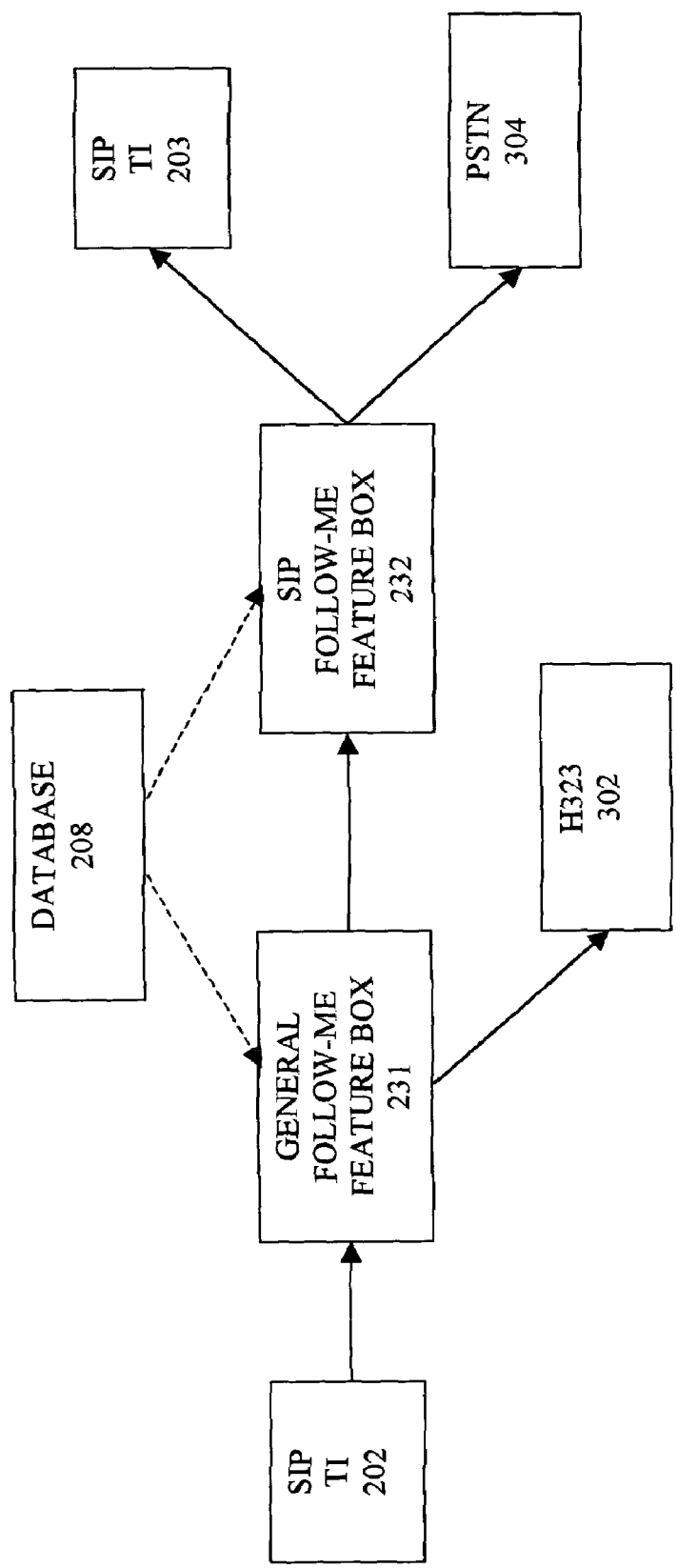
FIG. 3 is a schematic diagram of call flow through the feature boxes of the domain of FIG. 2.

One implementation of the follow-me feature in the ECLIPSE domain 200 is shown in FIG. 3. A user subscribes to the follow-me feature as a follow-me feature box provided in Z3. When a call request is received, the inbound SIP TI 202 generates a setup message with the dialed string as the TO address. The setup message is routed to follow-me message boxes based on the target address generated from the dialed string. When the follow-me feature box receives the setup message, it will get the contact address stored for the dialed string stored by the database 208. The follow-me feature box then replaces the contact address in the target field and continues routing the call to the invited party at the user preferred address, or will try multiple addresses (such as an H.323 protocol device 302, a telephone on a PSTN 304, or another user on the ECLIPSE domain via SIP TI 203) in priority order. The follow me feature box may be established as two separate feature boxes, a general follow-me feature box 231 for handling third party protocols and an SIP follow-me feature box 232 to handle SIP specific arguments in a signaling message. This separation allows ready adaptation of a variety of third party protocols.

Figure 4:
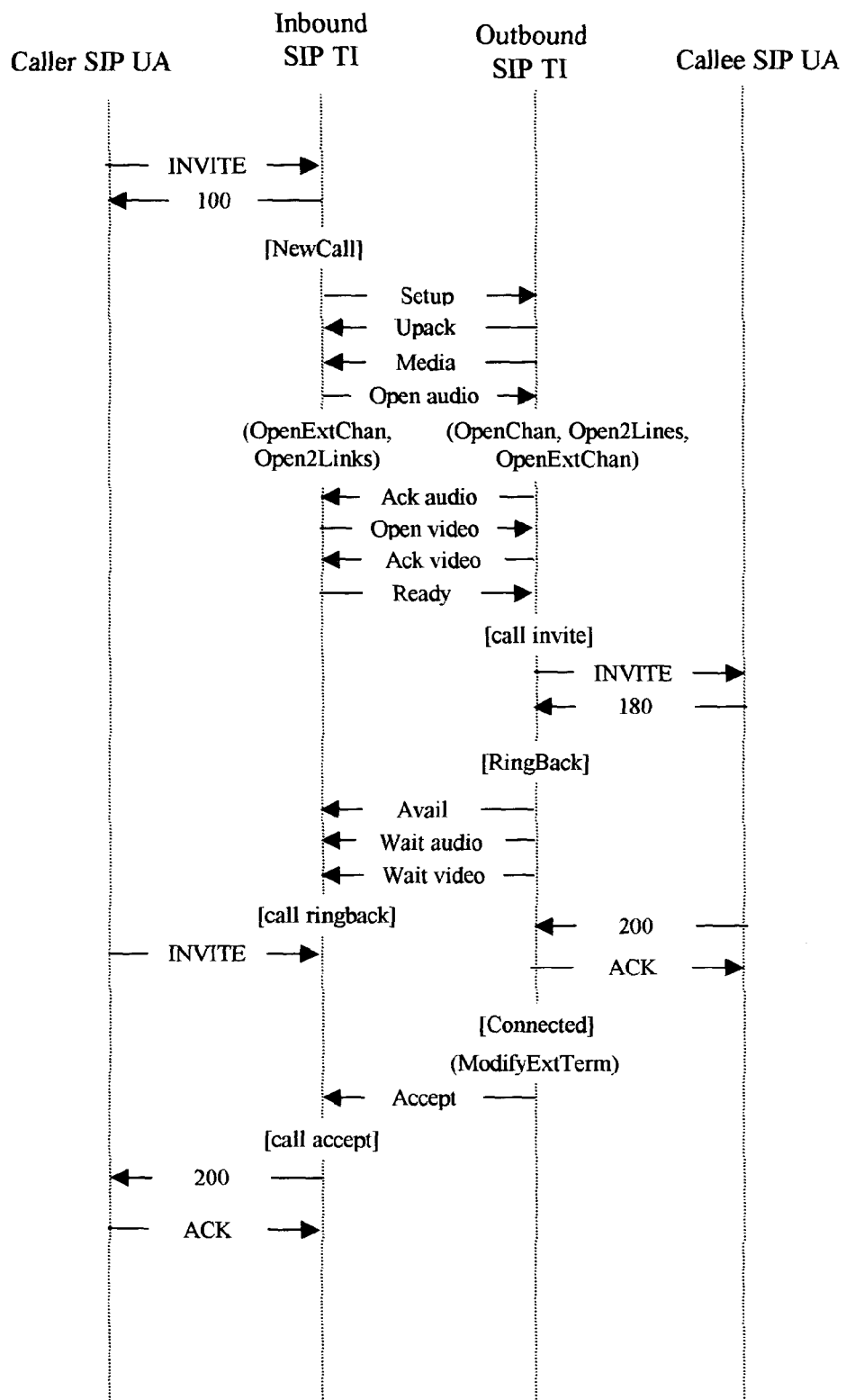
FIG. 4 is a call flow chart of an exemplary successful call setup process in the SIP network environment of FIG. 1.

FIG. 4 displays a call flow diagram for an exemplary successful call setup in the ECLIPSE domain 200. A caller SIP UA 102 sends an invite to inbound SIP TI 202, which acknowledges with a status-code "100" (trying). The "100" response is meant to stop continuous re-transmissions of INVITE request only and does not need to be propagated further upstream. A new call message is sent from the SIP TI 102 to the incoming media switch 206. The SIP TI 202 then generates a setup message that is, in turn, sent to outbound SIP TI 203, which responds with an upstream ACK and media message. The inbound SIP TI 102 responds with open audio and open video messages that are then acknowledged. External channels and lines for the media flow are also determined and communicated to the SIP stack. A ready signal is then sent from inbound to outbound SIP TI 203 to the outbound SIP TI 203 then sands an INVITE message to the callee's SIP UA 102.

Callee's SIP UA responds with a "180" (wait) status-code, and may send multiple messages for each open media channel, which are propagated upstream ultimately to caller's SIP UA 102. After the callee's SIP UA 102 provides a "200" status-code (OK) to outbound SIP TI 203, that response is ultimately propagated upstream to caller's SIP UA 102. "200" messages are acknowledged by both SIP TIs and SIP UAs that receive them. Between the inbound and outbound SIP TIs, the "200" message is propagated as an ACCEPT message. If some media channels in the original INVITE request are not included in a 200 response, a reject message will be sent upstream for those media channels.

Figure 5:
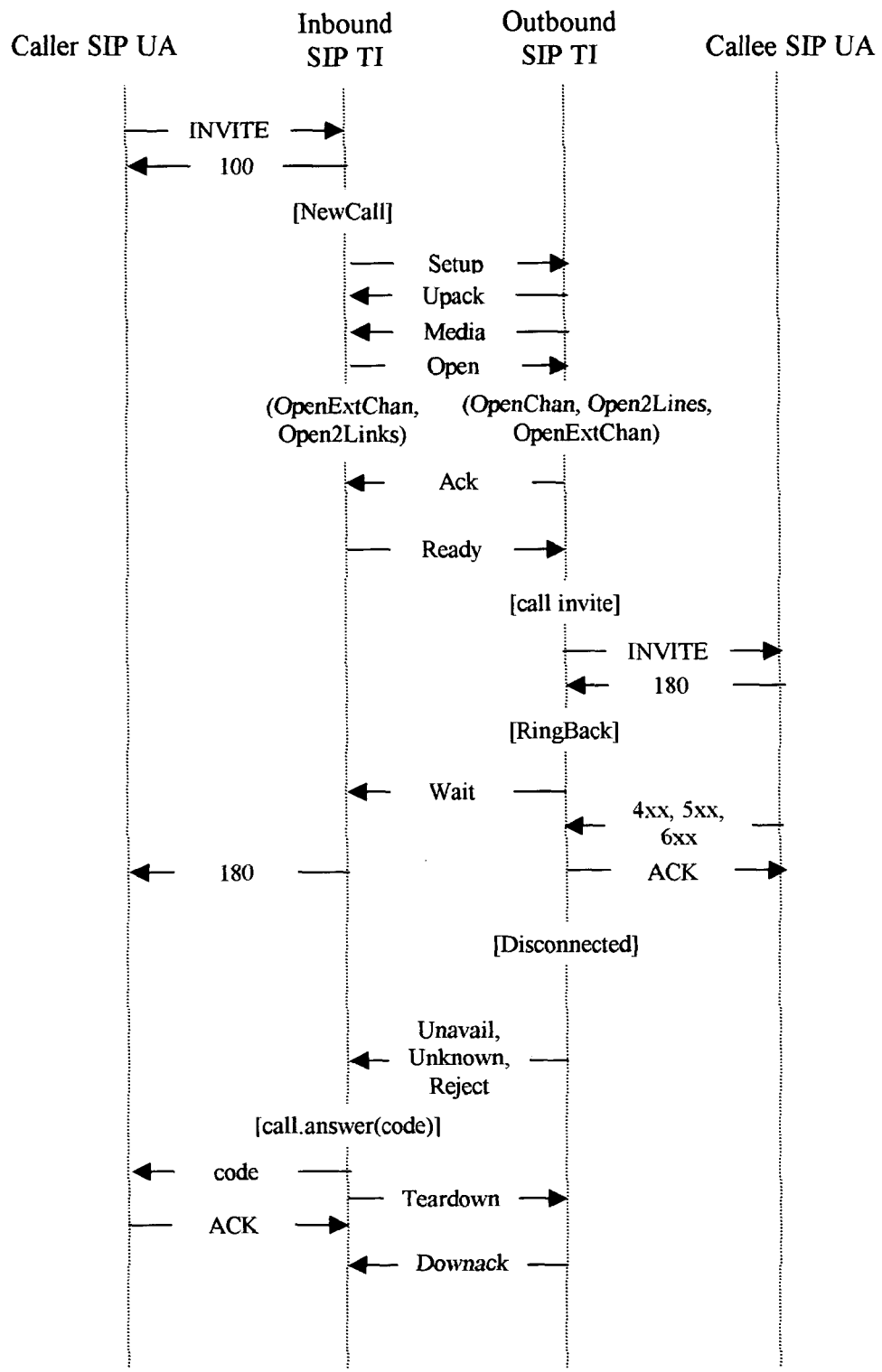
FIG. 5 is a call flow chart of an exemplary failed call setup process in the SIP network environment of FIG. 1.

An exemplary unsuccessful call setup, as shown in FIG. 5, follows the same initial steps as that described for FIG. 4, up to transmission of the INVITE request from outbound SIP TI 203. However, instead of a "200" response the callee's SIP UA 102 transmits a 4xx (request failure), 5xx (server failure) or 6xx (global failure) status-code. In response to one of these response, the outbound SIP TI 203 transmits an unavail message upstream, resulting in a code message being transmitted from inbound SIP TI 202 to caller's SIP UA 102. A teardown message is then transmitted from inbound to outbound SIP TIs. Both the code and teardown messages are acknowledged.

Figure 6:
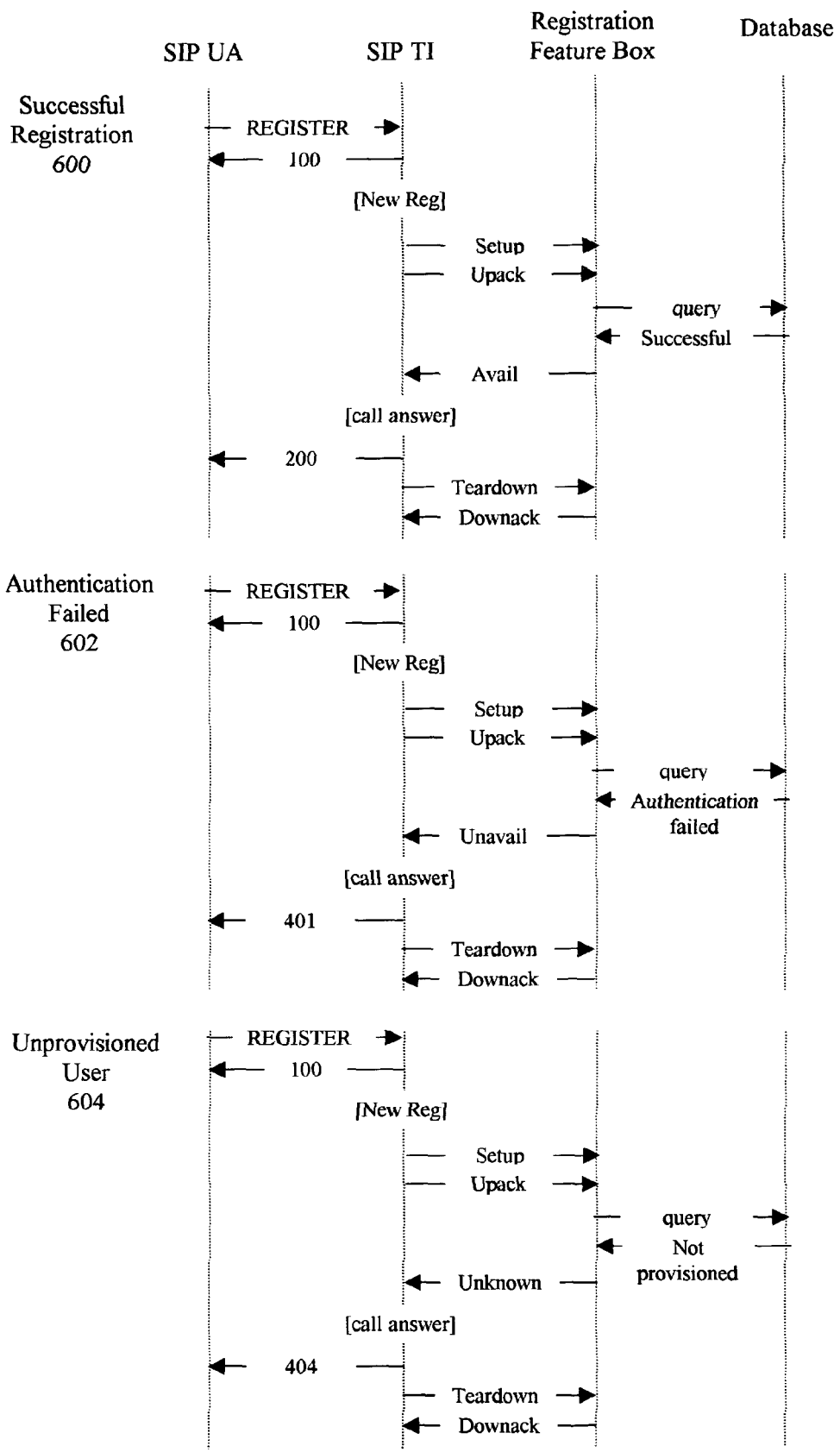
FIG. 6 is a call flow chart of exemplary registration processes in the SIP network environment of FIG. 1.

Call flows for various exemplary registration processes between a user and the ECLIPSE domain 200 are depicted in FIG. 6. A successful registration process 600 is first depicted. The process 600 commences with a REGISTER request sent from a caller's SIP UA 102 to inbound SIP TI 202. A "100" response is sent in acknowledgement. Setup and upstream acknowledgement messages are then sent to the SIP registration feature box. In turn, the SIP registration feature box contacts and queries the database 208. The current contact addresses and the expiration time of the contacts may be obtained from the database 208 or an external database. The database 208 responds with a success message to the SIP registration feature box, which in turn, sends an avail message downstream to the inbound SIP TI 202. A "200" message is then sent to the caller's SIP UA 102. The registration call is then subject to teardown.

The SIP BYE request is mapped to the DFC teardown message. When an inbound or outbound SIP TI receives a BYE request, it will acknowledge with a "200" response and then send the teardown message to the outbound SIP TI. When the outbound SIP TI receives the teardown message, it will send the BYE message to the remote SIP UA 102.

An unsuccessful registration process 602 due to failed authentication is next displayed, which proceeds in the same manner as process 600 up to the response to the query. If the database 208 can not authenticate a provisioned user (for example, when provisioning data is out of date or further authentication information is required), it responds to the query with an authentication-failed message to the SIP registration feature box. The SIP registration feature box generates an unavail message which is propagated upstream to inbound SIP TI 202. The inbound SIP TI 202 in turn, sends a "401" (unauthorized) status-code to the caller's SIP UA 102 with an appropriate challenge in the www-authentication header of the response, followed by a teardown of the registration call.

As shown in process 604, a "404" (not found) response could be sent in place of status-code "401" used in process 602 when a requested user instead can not be found in the system.

In addition to these processes, the ECLIPSE domain 200 is operative to respond to other status-code messages. For example, in a process where status code "183" (session progress) is received, the "183" response may be handled in the manner described for the "180" response above. In addition, 3xx feature boxes maybe provided to handle all 3xx requests requiring redirection of a call. Such 3xx feature boxes may try to handle redirection of a call where redirection preferences have been specified by a user. Otherwise, it may simply propagate 3xx responses upstream for handling by the domain endpoints.

The ECLIPSE domain 200 is also operative to incorporate other SIP message requests, such as OPTIONS (for exchanging media capabilities of SIP components), INFO (for carrying application level information along the SIP signaling path), REFER (for performing call transfers)SUBSCRIBE and NOTIFY (to provide user presence information), MESSAGE (for instant messaging) and DO (for network appliance control in SIP).

The SIP CANCEL message may be handled in the same manner as the SIP BYE request described in the proceeding descriptions. The CANCEL message is mapped to the DFC teardown message by SIP TIs. CANCEL differs from the BYE request in that it is used before the call is established. When an SIP TI receives a cancel request for an existing call setup session, it will send a "200: (OK) response back followed by a "487" (request terminated) for the original INVITE request. It will then send a teardown message to the outbound SIP TI and send the CANCEL request to the caller's SIP UA. If a final response such as the "200" (OK) status-code message is sent by the remote SIP UA prior to the CANCEL request, the SIP TI will instead send the BYE request. If other final responses are sent by the remote SIP UA (such as 4xx, 5xx and 6xx) the SIP TI will not send a response.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for establishing a call feature for a network telecommunications call, comprising:
   receiving an incoming session initiation protocol (SIP) request;
   determining a feature to be applied based on a parameter of the SIP request;
   assigning a feature box corresponding to the feature;
   converting at least a portion of the SIP request to a distributed feature composition (DFC) signaling message; and
   routing the request to the feature box using the DFC signaling message.

2. The method of claim 1, said incoming SIP request comprising a call request from a caller to a callee.

3. The method of claim 2, said parameter comprising at least one of: a source address of the caller and a target address of the callee.

4. The method of claim 3, wherein at least one of the caller and the callee is a subscriber of the feature to be applied.

5. The method of claim 2, said feature comprising at least one of:
   a call forwarding feature, a three-way calling feature, and a call conferencing feature.

6. The method of claim 2, said feature including a follow-me call feature in which a new target address for the callee is applied to the call request.

7. The method of claim 6, said follow-me call feature is implemented by at least two follow-me feature boxes.

8. The method of claim 7 further comprising:
   determining a priority of target addresses for the callee using the at least two follow-me feature boxes.

9. The method of claim 2, further comprising:
   converting the DFC signaling message to an outgoing SIP request after said routing; and
   routing the outgoing SIP request to a target address corresponding to the callee.

10. The method of claim 2, said DFC signaling message comprising an identification of a signaling path and a media path for the incoming SIP request.

11. The method of claim 10, said signaling path comprising an internal signaling path including the feature box and said media path comprising an external path for a media flow corresponding to the call request.

12. The method of claim 1, said incoming SIP request comprising a voice over Internet protocol (VoIP) call request.

13. The method of claim 1, said incoming SIP request comprising a registration request, said feature box comprising an SIP registration feature box.

14. The method of claim 1, said determining comprising:
   querying a database for the feature to be applied to the request.

15. The method of claim 1, said converting further comprising:
   storing the parameter as an SIP parameter in at least one field of the DFC signaling message.

16. The method of claim 1, said routing further comprising:
   routing the request by a featureless call to the feature box, wherein the feature box is dedicated to the request.

17. The method of claim 1, said feature comprising a plurality of features to be assigned to the request.

18. The method of claim 17, said routing further comprising:
   routing the request to a plurality of feature boxes in a predetermined order, each feature box assigned to one of the plurality of features.

19. The method of claim 18, said routing further comprising:
   routing the request to a first of the plurality of feature boxes based on the predetermined order of the plurality of feature boxes.

20. The method of claim 18, each said feature box corresponding to assigned zones of feature boxes, said predetermined order corresponding to a first priority of the assigned zones, and a second priority of features to be assigned within each of the assigned zones.

21. The method of claim 20, said assigned zones comprising a source zone, a dialed zone and a target zone.

22. The method of claim 1, further comprising:
   receiving a new feature for the request; and
   rerouting the request to a second feature box assigned to the new feature.

23. A method for routing a telecommunications request, comprising:
   receiving a request including a DFC signaling message having an SIP parameter, and
   routing the request to a plurality of feature boxes in a predetermined order, each feature box corresponding to a feature assigned to the request.

24. The method of claim 23, said request comprising a call request from a caller to a callee.

25. The method of claim 24, wherein at least one of the caller and the callee is a subscriber of the feature assigned to the request.

26. The method of claim 24, said feature comprising at least one of:
   a call forwarding feature, a three-way calling feature, a follow-me feature and a call conferencing feature.

27. The method of claim 24, further comprising:
   routing the request to the callee after the request has been routed through a last of the plurality feature boxes.

28. The method of claim 23, each said feature box corresponding to assigned zones of feature boxes, said predetermined order corresponding to a first priority of the assigned zones, and a second priority of features to be assigned within each of the assigned zone.

29. A method for completing a call request to a callee, comprising:
   receiving a DFC signaling message from a last of a plurality of feature boxes, the DFC signaling message corresponding to a call request from a caller to a callee;
   converting the DFC signaling message to an SIP request; and
   transmitting the SIP request to a target address of the callee.

30. The method of claim 29, said converting further comprising:
   retrieving an SIP parameter for the call request from at least one field of the DFC signaling message; and
   generating the SIP request from the SIP parameter.

31. The method of claim 29, further comprising:
   determining the target address based on a priority of callee addresses in accordance with a follow-me feature to which the callee is subscribed.

32. A method for routing a call request, comprising:
   receiving an incoming SIP call request from a caller to a callee, the callee comprising a subscriber to a follow-me feature;

routing the call request to a follow-me feature box using a DFC signaling message corresponding to the incoming SIP call request;

determining a priority of target addresses for the callee in accordance with stored callee preferences; and generating an outgoing SIP request for establishing a call between the caller and the callee, the outgoing SIP request transmitted sequentially to each target address according to the priority until the call is answered by the callee.

33. The method of claim 32, said follow-me feature box comprising an SIP follow-me feature box for handling SIP follow-me parameters and a general follow-me feature box for handling third-party follow-me parameters.

34. The method of claim 33, the general follow-me feature box having a higher priority in the routing of the call than the SIP follow me feature box.

35. An apparatus for establishing a call feature for a network telecommunications call, comprising:

means for receiving an incoming session initiation protocol (SIP) request;

means for determining a feature to be applied based on a parameter of the SIP request;

means for assigning a feature box corresponding to the feature;

means for converting at least a portion of the SIP request to a distributed feature composition (DFC) signaling message; and means for routing the request to the feature box using the DFC signaling message.

36. An apparatus for establishing a call feature for a network telecommunications call, comprising:

a processor; and a memory in communication with the processor, the memory storing a plurality of processing instructions directing the processor to:

receive an incoming session initiation protocol (SIP) request;

determine a feature to be applied based on a parameter of the SIP request;

assign a feature box corresponding to the feature;

convert at least a portion of the SIP request to a distributed feature composition (DFC) signaling message; and route the request to the feature box using the DFC signaling message.

* * * * *